United States Patent

Mao

[15] 3,637,456

[45] Jan. 25, 1972

[54] PROCESS FOR REINFORCING POLYVINYL CHLORIDE MECHANICAL FOAMS, AND IMITATION LEATHER MADE FROM SUCH FOAMS

[72] Inventor: Gerard Mao, Collonges au Mont D'Or, France

[73] Assignee: Etablissements A. Chomarat & Cie, Paris, France

[22] Filed: May 7, 1970

[21] Appl. No.: 35,503

[30] Foreign Application Priority Data

May 8, 1969 France.................................5912924

[52] U.S. Cl..............................161/64, 161/156, 161/159, 161/165, 161/166
[51] Int. Cl.....................B32b 5/08, B32b 5/18, B32b 7/00
[58] Field of Search......................161/62, 64, 156, 159, 165, 161/166

[56] References Cited

UNITED STATES PATENTS

| | | |
|---|---|---|
| 3,047,888 | 8/1962 | Shecter et al. ........................161/159 |
| 3,051,601 | 8/1962 | Schick ...................................161/159 |
| 3,081,517 | 3/1963 | Driesch..................................161/156 |
| 3,118,153 | 1/1964 | Hood......................................161/159 |
| 3,170,832 | 2/1965 | Wilson et al. ..........................161/160 |
| 3,215,584 | 11/1965 | McConnell et al. .....................161/64 |
| 3,396,062 | 8/1968 | White....................................161/160 |

*Primary Examiner*—William J. Van Balen
*Attorney*—Waters, Roditi, Schwartz & Nissen

[57] ABSTRACT

A polyvinyl chloride foam obtained by beating a plastisol is reinforced by incorporating textile fibers into the foam, before, during or after emulsification of the foam in a mechanical beater. The fibers may be natural or synthetic textile fibers such as superpolyamides or polyesters and they are from 1–2 deniers, 0.1–6 mm. in length and present in an amount between 2 and 20 percent by weight in the plastisol. Imitation leather is produced from these foams by joining two layers thereof together, one layer being of lower density but having a greater quantity of fibers therein per unit weight of the plastisol.

6 Claims, 1 Drawing Figure

PATENTED JAN 25 1972 3,637,456
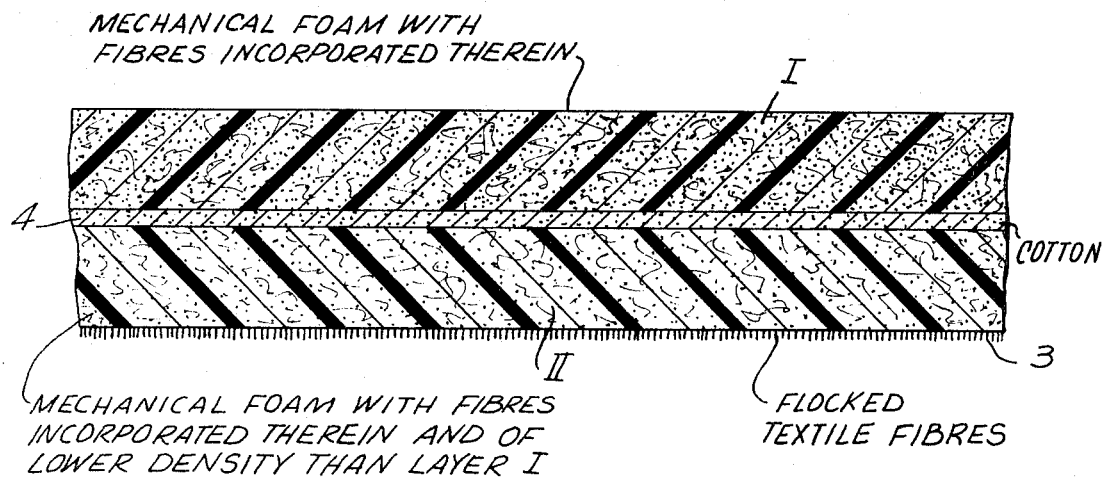

3,637,456

PROCESS FOR REINFORCING POLYVINYL CHLORIDE MECHANICAL FOAMS, AND IMITATION LEATHER MADE FROM SUCH FOAMS

SUMMARY OF THE INVENTION

This invention relates to a process for reinforcing the mechanical properties of mechanical foams made of polyvinyl chloride and to the application of these modified foams to the production of imitation leather materials.

Mechanical foams of polyvinyl chloride refer to foams obtained by beating a plastisol in the presence of air, a suitable emulsifying agent, such as soap, having been previously added to the plastisol. These foams are also known as "foams produced by the Vanderbilt process."

The term "Mechanical foams" is used in distinction to "chemical foams," obtained from a plastisol by decomposition with a foaming agent.

Mechanical foams are characterized by a network of intercommunicating open cells, whereas chemical foams, generally have closed cells.

Mechanical foams, as a result of this, have an excellent permeability to gases.

However, the mechanical properties of these foams are, most of the time, fairly low. By mechanical properties is understood: resistance to rupture, resistance to tearing and resistance to abrasion.

The present invention has been made from a consideration of the previously proposed mechanical foams.

This process of reinforcing the mechanical properties of mechanical foams of polyvinyl chloride consists of incorporating in the plastisol, before, during or after emulsification of the foam in a mechanical beater, natural, or synthetic textile fibers of chosen length and diameter, and in a predetermined quantity.

In particular, good results are obtained by using fibers of superpolyamides or polyesters of small diameter, of the order of from 1–2 deniers, between 0.1 and 6 mm. long, and in an amount of from 2–20 percent by weight of the plastisol.

The superpolyamides include nylon and the modified forms thereof such as nylon 6, nylon 66, nylon 610, etc. The polyesters include polyacrylates, polymethacrylates, PVA, Dacron, etc. Suitable natural fibers are wool, cotton, flax, hemp, linen, etc.

By the use of small diameters, the suppleness of the foam fiber assembly is retained.

The length of the fibers determines the resistance to tearing.

The load per unit area is limited by increasing viscosity of the assembly and the possibility of coating of the foam-fiber mixture.

The mechanical properties of the foams so reinforced are considerably improved.

The present invention extends to the preparation and to the application of these microporous foams reinforced by fibers.

The preparation, besides the coating, may be effected by casting, injection, moulding by rotation, soaking, or pulverization, in order to form hollow bodies or envelopes of different shapes, as can be done with ordinary plastisols.

Articles such as gloves, slippers, bootees can thus be made, in the same way as they are at present made in ordinary polyvinyl chloride.

These articles have, then, the advantages of air permeability, and the possibility of water absorption through their inner layer, as distinct from articles made of polyvinyl chloride which is solid or made cellular by a chemical process, and which do not possess this inner layer.

Another feature of the invention is the creation of a surface which has the appearance and the feel of a flesh split of leather, and which is obtained, after coating an appropriate support with the polyvinyl chloride foam, by the flocking of textile fibers on the foam coating, flocking being followed, after gelling, by rubbing.

The high density of fibers obtained on the surface by this process give the foam an improved resistance to abrasion, and at the same time a satisfying appearance and feel. Furthermore, the flocked and rubbed surface is like the inner side of imitation leather materials created in this way.

Hence, the present invention is characterized by the creation of a microporous surface skin, with good mechanical properties and, in particular, an excellent resistance to scratching and to abrasion.

DRAWING

The sole FIGURE of the drawing shows, in cross section, a portion of a sheet of imitation leather produced in accordance with the invention.

This surface skin, termed the outer part of imitation leather, can be likened to what is known as the "grain side" of leather. Referring to the drawing, therein the "grain side" is designated by I and it is obtained from a mechanical foam of high density, of the order of 0.8 to 1, containing a certain load per unit area of fibers. The load, the nature of these fibers and the composition of the foam may be different from those of the underneath layer designated by II and constituting the "flesh split." The flocked textile fibers on the underside of the layer II are designated by numeral 3.

Good results are obtained with fibers of superpolyamides of the type used in layers I and II and having a length of less than 0.5 mm., a diameter of between 1 and 2 deniers, and in an amount of the order of 2 to 10 percent by weight of an plastisol.

It is possible to improve the resistance to tearing of the grain side, flesh split assembly thus formed, by inserting between them a textile layer 4 such as knitted cloth, nonwoven fabric, felt, needled fabric or the like.

The imitation leather material thus obtained is characterized by the following properties:

its porosity to gases is excellent. The assembly "breathes."

its outer part or "grain side," while being microporous, has an excellent resistance to scratching and abrasion. It does not, however, let in water.

its inner part or "flesh split" is equally microporous.

It has very absorbent properties with respect to water (or perspiration).

Its appearance and feel are rather like that of a flesh split of leather.

Its resistance to abrasion is good.

The following examples are given to illustrate the invention. All the quantities are given in parts by weight, unless stated to the contrary.

EXAMPLE I

A foam reinforced with fibers intended to constitute the outer part of an imitation leather material was prepared as follows:

With the help of a mechanical beater, the following composition was emulsified:

| | |
|---|---|
| Polyvinyl chloride | 100 |
| Dioctyl phthalate | 30 |
| Benzyl butyl phthalate | 30 |
| Epoxydized soya oil | 5 |
| Emulsifying agent | 5 (for example Fomade B) |
| Superpolyamide fibers (Nylon) | 8 (uncalibrated flock of superpolyamides) |
| Coloring | |

The resultant foam was applied on a silicone surface paper with the aid of a doctor knife.

Pregelling was then carried out for 30 seconds at 170° C. and a layer I was obtained having a density of about 0.8 to 0.9.

Next, a foam reinforced with fibers was prepared, which was intended to form the inner face of the imitation leather material and which was also emulsified in a mechanical beater. Its composition was as follows:

| | |
|---|---|
| Polyvinyl chloride | 100 |
| Dioctyl phthalate | 40 |

| | |
|---|---|
| Benzyl butyl phthalate | 40 |
| Epoxydized soya oil | 40 |
| Emulsifying agent | 10 to 12 |
| Superpolyamide fibers (Nylon) | 15 (uncalibrated flock of superpolyamides) |
| Coloring | |

With the aid of a doctor knife, the resultant foam was deposited on layer I as layer II. After deposit of the layer II, flocking with a superpolyamide fiber (nylon) was effected in such a way as to cover the entire surface of the foam. Gelling of the assembly then followed, for example for 3 minutes at 180° C. The density of layer II was about 0.5–0.6.

After cooling, layer II was rubbed with a fine abrasive paper, whereafter layers I and II were stripped from the silicone-coated paper.

The finishing of the assembly constituted by layers I and II can be carried out by graining and varnishing layer I. Finally, the assembly was varnished using an uneven roller so as not to form a continuous film on the surface which would prevent the assembly from breathing.

An imitation leather material is thus obtained.

EXAMPLE II

Layer I was prepared as in example I and a film of cotton was adhesively attached thereto. Layer II, prepared as in example I, was then coated on the cotton film. Flocking and rubbing was then effected as in the preceding example.

EXAMPLE III

Layers I and II were prepared as in example I, but in place of the flocking, a felt or nonwoven fabric was glued on.

EXAMPLE IV

Layer I was prepared as in example I and a nonwoven fabric was glued directly thereon.

EXAMPLE V

The nylon fibers were replaced in the foam compositions of layers I and II with Dacron fibers in the same amount, and substantially similar results were obtained.

What is claimed is:

1. An imitation leather comprising an outer layer forming a grain side and constituted by a mechanical polyvinyl chloride plastisol foam of high density containing the fibers, and an inner layer forming a flesh split bonded to said outer layer and constituted by a mechanical polyvinyl chloride plastisol foam of a lower density than the outer layer, but containing the fibers in a greater amount per unit area of foam.

2. Imitation leather as claimed in claim 1, wherein the outer layer is composed of a mechanical foam having a density of from 0.8 and 1.

3. Imitation leather as claimed in claim 2, wherein the fiber amount in the outer layer is from 2 and 10 percent by weight based on the weight of the plastisol, said fibers being superpolyamides, having a length less than 0.5 mm. and a diameter of from 1 to 2 deniers.

4. Imitation leather as claimed in claim 1 comprising a large quantity of fibers flocked on the exposed surface of the inner layer, said fibers being rubbed after gelling so that that side has the appearance and feel of the inner side of a flesh split of leather.

5. Imitation leather as claimed in claim 1 comprising a textile layer secured between the inner and outer layers.

6. Imitation leather as claimed in claim 5, wherein the textile layer is selected from the group consisting of knitted, nonwoven or needled felt.

* * * * *